(12) United States Patent
Köhler et al.

(10) Patent No.: US 6,231,897 B1
(45) Date of Patent: May 15, 2001

(54) METHOD FOR PRODUCING GREEN-FODDER BASED FEED

(75) Inventors: Friedrich Köhler, Langwedel; Hans-Jürgen Steinebach, Verden, both of (DE)

(73) Assignee: Effem GmbH, Verden (DE)

( * ) Notice: Subject to any disclaimer, the term of this patent is extended or adjusted under 35 U.S.C. 154(b) by 0 days.

(21) Appl. No.: 09/355,411

(22) PCT Filed: Jan. 27, 1998

(86) PCT No.: PCT/DE98/00252

§ 371 Date: Oct. 21, 1999

§ 102(e) Date: Oct. 21, 1999

(87) PCT Pub. No.: WO98/32342

PCT Pub. Date: Jul. 30, 1998

(30) Foreign Application Priority Data

Jan. 27, 1997 (DE) ............................................. 197 02 797

(51) Int. Cl.[7] ........................................................ A23K 3/02
(52) U.S. Cl. ............................. 426/54; 426/72; 426/636; 426/601; 426/807
(58) Field of Search .................................. 426/54, 72, 74, 426/636, 807, 601

(56) References Cited

U.S. PATENT DOCUMENTS

| | | | |
|---|---|---|---|
| 3,753,723 | * | 8/1973 | Henderson et al. ................... 99/9 |
| 3,968,259 | * | 7/1976 | Henry et al. ......................... 426/63 |
| 3,982,028 | * | 9/1976 | Bellingham .......................... 426/69 |
| 4,015,018 | * | 3/1977 | Glabe et al. .......................... 426/2 |
| 4,737,365 | * | 4/1988 | Meyer .................................. 426/2 |
| 4,859,480 | * | 8/1989 | MacFarlane et al. .............. 426/310 |
| 5,120,565 | * | 6/1992 | Lanter et al. ..................... 426/623 |
| 5,371,011 | * | 12/1994 | Bernier et al. .................. 435/252.4 |
| 5,770,247 | * | 6/1998 | Satter et al. ........................ 426/2 |
| 5,789,001 | * | 8/1998 | Klopfenstein et al. .............. 426/2 |

FOREIGN PATENT DOCUMENTS

| | | | |
|---|---|---|---|
| 49690 | * | 4/1982 | (EP) . |
| 303477 | * | 2/1989 | (EP) . |

OTHER PUBLICATIONS

Report 1981, pp. 120, 109 ref., 1982.*

Doherty, Diss. Abstrs. 1 htl., C. vol. 56 (3), pp. 612–613, pulbished items 1994, 1995.*

Doreau et al., Anim. Feed. Sci. Technol., vol. 44(3–4) pp. 181–9, 1993.*

Jenkins et al., Jour. Dairy Sci., vo. 75(3), p. 796–803, Mar. 1992.*

* cited by examiner

*Primary Examiner*—Chhaya D. Sayala
(74) *Attorney, Agent, or Firm*—Dorsey & Whitney LLP

(57) ABSTRACT

Process for the production of a feed based on green fodder, which has undergone a silaging process, wherein, prior to the silaging process, at least one oil-containing or fat-containing substance is added to the green fodder.

6 Claims, No Drawings

METHOD FOR PRODUCING GREEN-FODDER BASED FEED

BACKGROUND OF THE INVENTION

The invention relates to a process for the production of a feed based on green fodder, which has undergone a silaging process, as well as to a corresponding feed.

FIELD OF THE INVENTION

The energy density of feeds can be significantly increased by the use of fats. Hitherto use has been made thereof in the form of so-called fatting of concentrated feed mixtures. Such concentrated feed mixtures are often fed as a supplement to the standard silage. Silage, which constitutes the basic feed for animals, is nowadays usually produced in the following manner: Green fodder, e.g. cut grass, optionally following a predrying phase of 1 to 2 days, is pressed by means of a corresponding press into round bales and is then packed in airtight manner in film. Under the thus produced anaerobic conditions, enzymatic processes take place yielding and a controlled fermentation, which gives a corresponding silage product after about 2 months.

SUMMARY OF THE INVENTION

As a result of the at present, separate feeding of silage and feed supplements and the resulting increased storage requirements, the cost and time expenditure is raised.

The problem of the invention is consequently to make available a complete silage, i.e. requiring no supplements.

According to the invention this problem is solved in that at least one oil-containing and/or fat-containing substance is added to the green fodder prior to the silaging process.

Preferably, predried grass is used as the starting material for the silaging process.

The preferred oil-containing or fat-containing substances, which can be used in the process according to the invention, are soy oil, rape oil, coconut oil, palm oil or mixtures thereof or corresponding oil and fat-containing press cakes or pellets.

In another preferred embodiment of the process according to the invention, prior to the silaging process, it is also possible to add a mixture to the green fodder containing mineral substances, trace elements and/or vitamins.

Preferably use is made of an aqueous solution of the mineral substances, trace elements and/or vitamins.

The invention also relates to a feed, which is characterized by a content of at least one oil-containing or fat-containing substance, preferably in the form of soy oil, rape oil, coconut oil, palm oil or a mixture thereof or corresponding oil or fat-containing press cakes or pellets.

According to a preferred embodiment of the feed according to the invention, it is characterized by an additional content of mineral substances, trace elements and/or vitamins.

Preferably the feed according to the invention can be produced with the process according to the invention.

The hitherto performed tests have surprisingly revealed that oils or fat-containing additives, added to the green fodder, such as e.g. grass prior to the silaging process, can be uniformly mixed with the substrate. The originally feared demixing was not observed.

It is particularly noteworthy that the addition of oils and fat-containing additives does not significantly influence the fermentation of the silage. In fact, all the silage operations were successful.

The tests carried out up to now consequently allow the conclusion to be drawn that surprisingly, when silaging green fodder it is possible to add oil-containing and/or fat-containing substances without impairing successful conservation or preservation. In fact, a fatted basic feed is obtained, which constitutes a complete feed for animals, so that it is no longer necessary to add concentrated feed mixtures.

The fatted, novel feed is readily accepted by animals, i.e. no acceptance problems were observed. The novel feed can be used for different animal types. Although initially intended mainly for horses or cattle, a further use for other animals essentially fed on the basis of silaged green fodder is conceivable and possible.

DETAILED DESCRIPTION OF THE PREFERRED EMBODIMENTS

Further features and advantages of the invention can be gathered from the following more detailed description of the tests carried out up to now.

In a first test series laboratory tests were performed. Use was made of four different oils or oil-containing or fat-containing substances, namely rape oil, soy oil, rape press cakes and soy oil-containing pellets. They were mixed in three concentration stages with fresh or predried grass. In a supplementary test series an investigation took place of the addition of a mineral substance mixture, such as would be suitable e.g. for supplementing a feed for horses.

The starting materials, i.e. the fresh or predried grass and the oils or oil-containing or fat-containing substances or mineral substance mixture were pressed into 1.5 liter capacity jars, sealed in airtight manner and in this way silaged on a laboratory scale at a constant ambient temperature of 25° C. The course of the fermentation was monitored after 1, 3, 6 and 12 months by a time-staggered opening.

A check was made to establish whether the additives were uniformly admixable with the substrate, what influence the additives had on the course of silaging and how the additives were influenced by silaging.

The substrate for all the variants was on the one hand fresh grass (22% TS) and on the other predried grass (42% TS).

The following parameters were investigated after 1, 3, 6 and 12 months storage:

- The fermentation losses were determined by weight balances of all the test batches.
- The silages were classified by an organoleptic analysis at the time of opening.
- Acidification was determined by measuring the pH-value.
- The TS content and fermentation losses were determined.
- The relative quantity and fatty acid pattern of the oils and fats contained in the silages were determined.

The following parameters were additionally investigated after 6 and 12 month storage:

- The aerobic stability (perishability after removal from storage) of the silages was tested under controlled conditions.
- The fermentation acid patterns were determined.

The tests led to the following results:

- The oils and oil-containing or fat-containing additives could be uniformly mixed with the substrate under test conditions, no demixing being observed.
- All the silages were successful. In particular, there were no significant pH-value differences. The pH-value differences between the variants with fresh and predried grass as the substrate are considered normal and can be explained by the different TS content. The pH-values measured during the test can be gathered from the following tables.

TABLE 1

Starting material = fresh grass

| Additive | None | Rape oil | | | Soy oil | | | Pellets | | | Rape press cake | | | Mineral substance mixture |
|---|---|---|---|---|---|---|---|---|---|---|---|---|---|---|
| Opening | | 3% | 6% | 9% | 3% | 6% | 9% | 10% | 20% | 30% | 10% | 20% | 30% | 2% |
| After 1 month | 3.7 | 3.7 | 3.7 | 3.7 | 3.7 | 3.7 | 3.7 | 3.7 | 3.8 | 3.8 | 3.7 | 3.7 | 3.8 | 3.7 |
| After 3 months | 3.9 | 3.9 | 3.9 | 3.8 | 3.9 | 3.9 | 3.9 | 3.9 | 3.9 | 4.0 | 3.9 | 3.9 | 3.9 | 3.9 |
| After 6 months | 3.8 | 3.8 | 3.8 | 3.8 | 3.8 | 3.8 | 3.8 | 3.8 | 3.9 | 3.7 | 3.7 | 3.7 | 3.7 | 3.8 |

TABLE 2

(starting material = predried grass)

| Additive | None | Rape oil | | | Soy oil | | | Pellets | | | Rape press cake | | | Mineral substance mixture |
|---|---|---|---|---|---|---|---|---|---|---|---|---|---|---|
| Opening | | 3% | 6% | 9% | 3% | 6% | 9% | 10% | 20% | 30% | 10% | 20% | 30% | 2% |
| After 1 month | 4.6 | 4.6 | 4.6 | 4.6 | 4.6 | 4.6 | 4.6 | 4.6 | 4.7 | 4.8 | 4.6 | 4.7 | 4.7 | 4.7 |
| After 3 months | 4.6 | 4.5 | 4.6 | 4.6 | 4.6 | 4.6 | 4.6 | 4.6 | 4.6 | 4.7 | 4.6 | 4.6 | 4.6 | 4.7 |
| After 6 months | 4.4 | 4.4 | 4.4 | 4.4 | 4.4 | 4.4 | 4.4 | 4.4 | 4.5 | 4.6 | 4.5 | 4.4 | 4.4 | 4.5 |

The aerobic stability of the silages was excellent. The measured values reveal no influences of the admixed additives or the admixed quantities.

The fermentation acid analysis performed by gas chromatography revealed no significant through the additives.

The investigation of the fatty acid pattern gave the expected results, i.e. essentially the fatty acid patterns of the additives, which means that the silaging process led to no significant and in particular no negative changes.

At present large scale tests are being carried out, to establish whether the laboratory results can be transferred to silaging technology, such as is conventionally used in agriculture. The initial, intermediate results reveal that comparable, positive results are obtained under field conditions.

The features of the invention disclosed in the above description and in the claims, both individually and in random combination, can be essential to the implementation of the different embodiments of the invention.

What is claimed is:

1. A process for producing a green-fodder based feed comprising the steps of:

a. uniformly mixing at least one oil-containing and/or fat containing substance to green fodder in an amount in a range of about 3% to 30% of the total weight to produce a mixture; and after producing said mixture b. silaging said mixture.

2. The process according to claim 1, wherein said fodder comprises pre-dried grass.

3. The process according to claims 1 or 2, wherein said oil-containing and/or fat containing substances comprise press cakes and/or pellets.

4. The process according to claims 1, or 2, wherein said oil containing and/or fat containing substances are selected from the group consisting of soy oil, rape oil, coconut oil, palm oil, and a mixture thereof.

5. The process according to claim 1, wherein mineral substances, trace elements and/or vitamins are added to said mixture prior to silaging.

6. The process according to claim 5, wherein said mineral substances, trace elements and/or vitamins are an aqueous solution.

* * * * *